US011499526B2

(12) United States Patent
Khadilkar (10) Patent No.: US 11,499,526 B2
(45) Date of Patent: Nov. 15, 2022

(54) APPARATUS FOR WIND POWER GENERATION

(71) Applicant: Sandeep Khadilkar, Bangalore (IN)

(72) Inventor: Sandeep Khadilkar, Bangalore (IN)

( * ) Notice: Subject to any disclaimer, the term of this patent is extended or adjusted under 35 U.S.C. 154(b) by 93 days.

(21) Appl. No.: 17/267,881

(22) PCT Filed: Aug. 20, 2019

(86) PCT No.: PCT/IN2019/050608
§ 371 (c)(1),
(2) Date: Feb. 11, 2021

(87) PCT Pub. No.: WO2020/039459
PCT Pub. Date: Feb. 27, 2020

(65) Prior Publication Data
US 2021/0180567 A1    Jun. 17, 2021

(30) Foreign Application Priority Data

Aug. 21, 2018   (IN) .............................. 201841031253

(51) Int. Cl.
*F03D 9/25*          (2016.01)
*F03D 3/00*          (2006.01)
(Continued)

(52) U.S. Cl.
CPC .............. *F03D 9/25* (2016.05); *F03D 3/002* (2013.01); *F03D 3/02* (2013.01); *F03D 3/04* (2013.01);
(Continued)

(58) Field of Classification Search
CPC ... F03D 9/25; F03D 3/002; F03D 3/02; F03D 3/04; H02K 3/02; H02K 7/183; H02K 21/24; F05B 2240/131
See application file for complete search history.

(56) References Cited

U.S. PATENT DOCUMENTS 6,800,955 B2    10/2004  McDavid, Jr.
8,961,103 B1    2/2015   Wolff
(Continued)

FOREIGN PATENT DOCUMENTS

CN    101892960 A    11/2010
CN    102112735 A    6/2011
(Continued)

OTHER PUBLICATIONS

Examination Report issued in corresponding Indian Application No. 201841031253 dated Sep. 21, 2020.
(Continued)

*Primary Examiner* — Sean Gugger
(74) *Attorney, Agent, or Firm* — Foley & Lardner LLP (57) ABSTRACT

The present disclosure relates to an apparatus (10) for wind power generation comprising at least one primary wind duct (12); at least one secondary wind duct (14); at least one pressure-balancing and guiding unit (14); at least one primary blade unit (20); at least one booster and generator unit (22); at least one secondary blade unit (24); and at least one extractor (26). Characteristically, a counter-rotating motion is created between the primary blade unit (20), the secondary blade unit (24) and the components of the booster and generator unit (22), which causes an increase in the velocity of the wind flowing through the apparatus (10) and a resultant increase in the impact of the high velocity wind on the blades; further amplifying the self-reinforcing effect occurring at each stage of the apparatus (10).

9 Claims, 9 Drawing Sheets

(51) Int. Cl.
*F03D 3/02* (2006.01)
*F03D 3/04* (2006.01)
*H02K 3/02* (2006.01)
*H02K 7/18* (2006.01)
*H02K 21/24* (2006.01)

(52) U.S. Cl.
CPC ............... *H02K 3/02* (2013.01); *H02K 7/183* (2013.01); *H02K 21/24* (2013.01); *F05B 2240/131* (2013.01)

(56) References Cited

U.S. PATENT DOCUMENTS

| | | |
|---|---|---|
| 2011/0266802 A1 | 11/2011 | Rehman Alvi |
| 2014/0183867 A1 | 7/2014 | Alvi |
| 2015/0167631 A1 | 6/2015 | Prindle |
| 2016/0017862 A1 | 1/2016 | Allaei |
| 2016/0084227 A1 | 3/2016 | Krippene |
| 2016/0186727 A1 | 6/2016 | Allaei |
| 2016/0377053 A1 | 12/2016 | Reyna |

FOREIGN PATENT DOCUMENTS

| | | |
|---|---|---|
| CN | 105927475 A | 9/2016 |
| IN | 4627/CHENP/2014 A | 9/2015 |
| WO | WO-2015/035262 A1 | 3/2015 |

OTHER PUBLICATIONS

International Search Report issued in corresponding application No. PCT/IN2019/050608 dated Oct. 21, 2019.

APPARATUS FOR WIND POWER GENERATION

The present specification takes priority from the provisional application titled APPARATUS FOR WIND POWER GENERATION filed on 21 Aug. 2018 having application number 201841031253.

FIELD

The present disclosure relates to an apparatus for wind power generation.

BACKGROUND

The practice of harnessing the kinetic energy of wind to generate electrical energy, has been in force since as early as the $17^{th}$ century. The apparatus facilitating said conversion has evolved tremendously over the years and can be broadly classified into two types—horizontal axis type or of the vertical axis type.

Horizontal axis wind turbines (HAWT) with three large blades upwind of a tower, produce a majority of wind power in the world today. The blades of the HAWTs look like a propeller and spin on a main rotor shaft arranged on a horizontal axis. Despite being popular, HAWTs are associated with several disadvantages such as the necessity to construct a massive tower to support the heavy components; necessity of inclusion of an additional yaw control mechanism to turn the blades toward the wind; necessity of inclusion of a braking or yawing device in high winds to stop the turbine from spinning and destroying or damaging itself; high maintenance and replacement requirements due to fatigue and structural failure of downwind HAWTs caused by turbulence when a blade passes through the tower's wind shadow and the like.

Vertical-axis wind turbines (or VAWTs) are characterized by having the main rotor shaft arranged vertically and do not need to be pointed into the wind to be effective; thereby negating the effect of the wind direction being highly variable. The conventionally used VAWTs are also associated with some disadvantages such as the low rotational speed creating a higher torque and consequently an expensive drive train; the inherently lower power coefficient; the difficulty of modelling the wind flow accurately causing challenges of analyzing and designing the rotor prior to fabricating a prototype and the like. Further, as the horizontal axis wind turbines and the conventional vertical axis turbines use the direct wind flow to rotate the blades, the actual volume of wind impact onto the blade is 10-20% of total flow and hence the torque conversion efficiency is limited to maximum 59% for the horizontal wind turbine. Even further, as the surrounding conditions required to operate the direct flow wind turbines are difficult to get in cities, the turbines are constructed at remote locations; thereby causing transmission losses while supplying power to the end users in cities.

The inventor of the present disclosure has envisaged an apparatus for wind power generation which mitigates the afore-mentioned drawbacks.

OBJECTS

It is an object of the present disclosure to provide an apparatus for wind power generation.

It is another object of the present disclosure to provide an apparatus for wind power generation which is self-reinforcing.

It is yet another object of the present disclosure to provide an apparatus for wind power generation which is cost and time efficient.

It is still another object of the present disclosure to provide an apparatus for wind power generation which is light in weight.

It is yet another object of the present disclosure to provide an apparatus for wind power generation which is ecologically safe.

It is still another object of the present disclosure to provide an apparatus for wind power generation which is less reliant on external environmental factors.

SUMMARY

The present disclosure provides an apparatus for wind power generation comprising at least one primary wind duct comprising a plurality of converging modules arranged centripetally along a vertical channel; said modules adapted to draw in the wind blowing in the surroundings, compress and direct the resulting high velocity wind into said vertical channel; at least one secondary wind duct mounted coaxially over said primary wind duct, comprising a plurality of converging modules arranged centripetally along said vertical channel and adapted to draw in the wind blowing in the surroundings, compress and direct the resulting high velocity wind into said vertical channel; wherein the high velocity wind blowing in the vertical channel, creates a low pressure area in said secondary duct causing more wind to get sucked into the secondary duct, creating a cascading effect; at least one pressure-balancing and guiding unit mounted coaxially on said secondary wind duct, comprising a duct end and a blade end, wherein said duct end is fitted with at least one one-way valve for each converging module which prevents wind from escaping out of the apparatus through the wind ducts and said blade end is fitted with a plurality of nozzles to guide the wind contained in the vertical channel into a primary blade unit, at a rate which facilitates maximum power generation; at least one primary blade unit mounted coaxially on said pressure-balancing and guiding unit, comprising at least one blade mounted on a shaft and adapted to rotate due to the high velocity wind coming in from the pressure-balancing and guiding unit; at least one booster and generator unit mounted coaxially on the primary blade unit, comprising at least one wind intake system and at least one axial flux DC generator, wherein said wind intake system comprises booster ducts adapted to increase the volume of the wind and to maintain the required pressure for operation of the apparatus and said axial flux DC generator comprises a plurality of alternating layers of copper wire coils and permanent magnets, adapted to convert the mechanical energy of the rotating shaft of the primary blade unit to electrical energy; at least one secondary blade unit mounted coaxially over said booster and generator unit, comprising at least one blade mounted on a shaft and adapted to rotate due to the velocity of the wind coming in from the booster and generator unit; and at least one extractor mounted coaxially on said secondary blade unit and adapted to utilize the surrounding wind flow to create vacuum for exit wind, thereby creating additional pressure potential between intake and exhaust, wherein the direction of rotation of the copper wire coils in the axial flux DC generator is influenced by the direction of rotation of said secondary blade(s) and the direction of rotation of the permanent magnets in the axial flux DC generator is influenced by the direction of rotation of said primary blade(s) to create a counter-rotating motion between the primary blade unit, the secondary blade unit and the components of the booster and generator unit, thereby causing an increase in the velocity of the wind flowing through the apparatus and a resultant increase in the impact of said high velocity wind on the blades; further amplifying the self-reinforcing effect occurring at each stage of the apparatus.

BRIEF DESCRIPTION OF THE DRAWINGS

The objectives and advantages of the proposed invention will be more clearly understood from the following description of the proposed invention taken in conjunction with the accompanying drawings, wherein.

DETAILED DESCRIPTION

Almost invariably, the performance of conventional wind power generation apparatus' depends on external wind conditions such as speed, direction and the like. If the speed of the wind blowing in the surroundings is low, electricity generation will be compromised. If the direction of the wind blowing in the surroundings is non-favorable, electricity generation will be compromised. Further, even if high velocity wind enters the apparatus, weak construction and design causes a high degree of velocity loss as the wind traverses the length and breadth of the apparatus, leading to compromised electricity generation. Faulty construction and design also causes the high velocity wind to leak out of the apparatus, again affecting electricity generation.

In accordance with one aspect, the present disclosure provides an apparatus (10) for wind power generation that mitigates the afore-mentioned drawbacks as described below in the preferred embodiment. The apparatus (10) comprises the components mentioned herein after.

Figure 1:
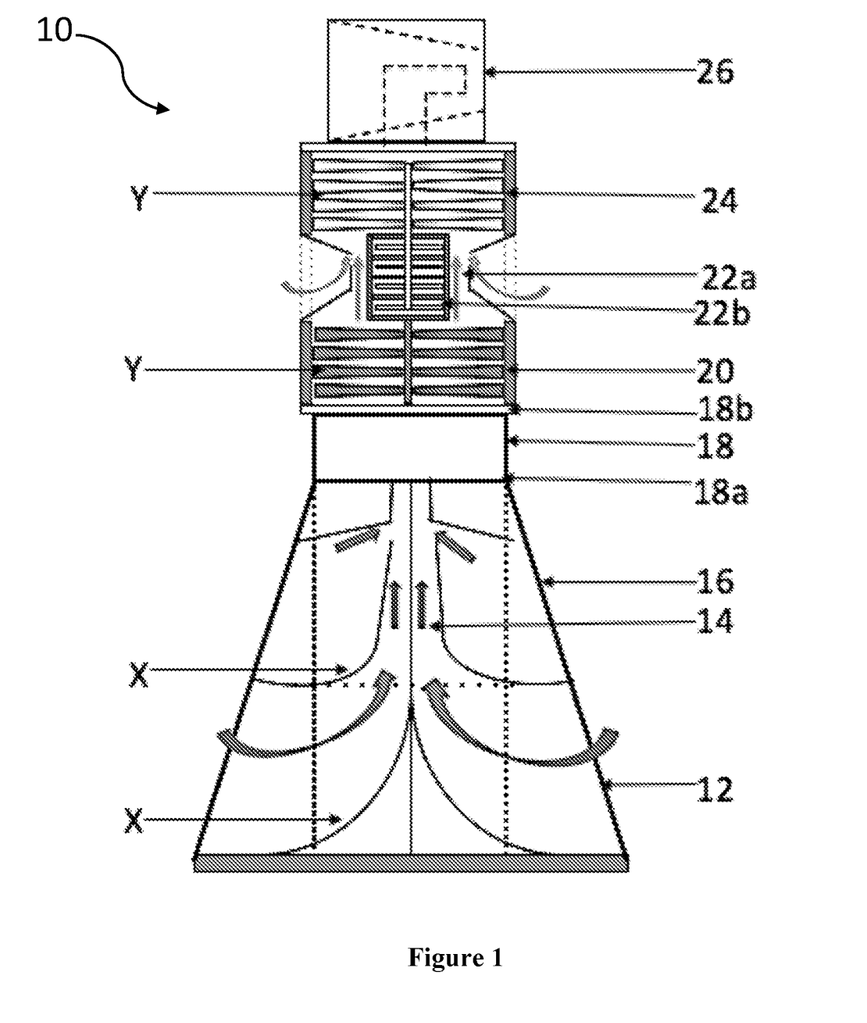
FIG. 1 illustrates a cross sectional view of one embodiment of the apparatus (10) of the present disclosure.
Figure 2:
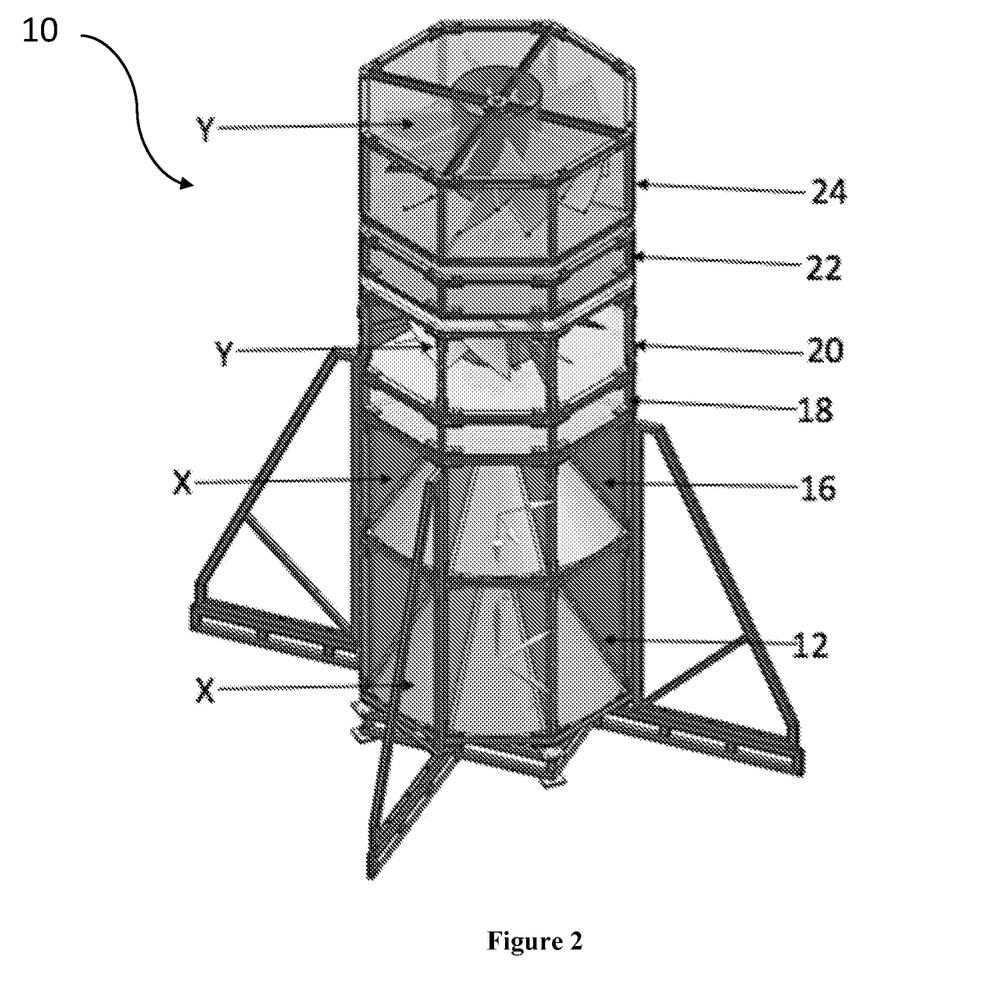
FIG. 2 illustrates a perspective view of one embodiment of the apparatus (10) of the present disclosure.

FIG. 1 represents one embodiment of the apparatus (10) of the present disclosure, in cross section. The perspective view of the apparatus (10) is presented in FIG. 2. The present apparatus (10) comprises at least one primary wind duct (12) which is a cluster of a plurality of converging modules arranged centripetally along a central vertical channel. The converging modules have been indicated by the symbol X for ease of understanding. The characteristic design of the modules not only enables drawing in the wind blowing in the surroundings, but also compression of the same to cause an increase in pressure and consequently, an increase in the flowing velocity, before it is directed into a central vertical channel (14). Thus, even if the wind blowing in the surroundings is not very high in velocity, the effective velocity of the wind traversing through the length of the apparatus (10) remains high. The present apparatus (10), therefore demonstrates a self-reinforcing effect right at the first stage. The apparatus (10) of the present disclosure rests on the installation site, on the primary wind duct (12).

Figure 3:
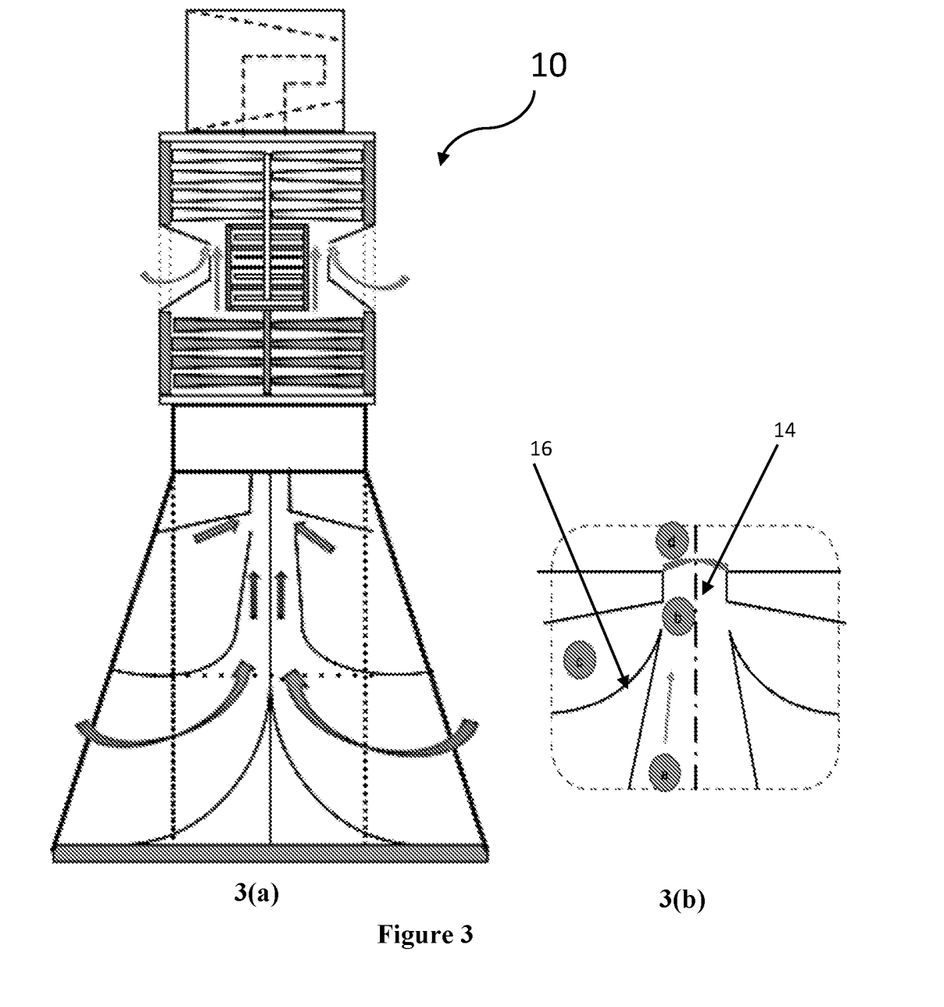
FIG. 3 illustrates the mechanism of wind flow through the lower part of the apparatus (10) of the present disclosure.

At least one secondary wind duct (16) is mounted coaxially over the primary wind duct (12) and comprises a plurality of converging modules arranged centripetally along the vertical channel (14), a construction similar to that of the primary wind duct (12). The modules of the secondary wind duct (16) are also therefore indicated by the symbol X. Like the primary wind duct (12), the secondary wind duct (16) is adapted to draw in the wind blowing in the surroundings, compress and direct the resulting high velocity wind into the vertical channel (14). Furthermore, the high velocity wind blowing in the vertical channel (14) from the primary duct (12), creates a low pressure area at the end of the secondary duct (16) causing more wind to get sucked into the secondary duct (16). The low pressure area thus created is due to Bernoulli's principle. FIG. 3 illustrates the creation of such a low pressure area. The wind exiting from the primary duct (12) and gaining speed due to the converging vertical channel (14) is denoted by Point (a). Point (b) is the low pressure point where wind from the secondary duct (16, here c) gets added to the flow from Point (a). Point (d) is the one way, non-return valve mounted at the end (16a) of the vertical channel (14) (one for each converging module) that will be described subsequently. The afore-mentioned phenomenon, thus, creates a cascading and further self-reinforcing effect on the wind traversing the apparatus (10).

The vertical channel (14) of the present disclosure starts at the exit point of the primary wind duct (12) and ends at the pressure-balancing and guiding unit (18) described herein after. Just before the vertical channel (14) ends, the secondary wind duct (16) merges therewith.

Typically, the ratio between the primary wind duct (12) height and the secondary wind duct (16) height is defined by the average wind speed to get required vacuum at the end of primary duct (12). As the wind flow from the primary duct (12) and the secondary duct (16) meets at a point before entering the pressure balancing chamber (18), it should be ensured that the flow from primary duct (12) is higher than the secondary duct (16), as this flow difference determines how much vacuum is created at the merging point. Therefore, the height of the air collecting duct (12, 16) needs to be divided in a proportion (primary duct vs secondary duct) as per the average wind speed. In one embodiment, the primary wind duct (12) height is greater than the secondary wind duct (16) height.

Figure 8:
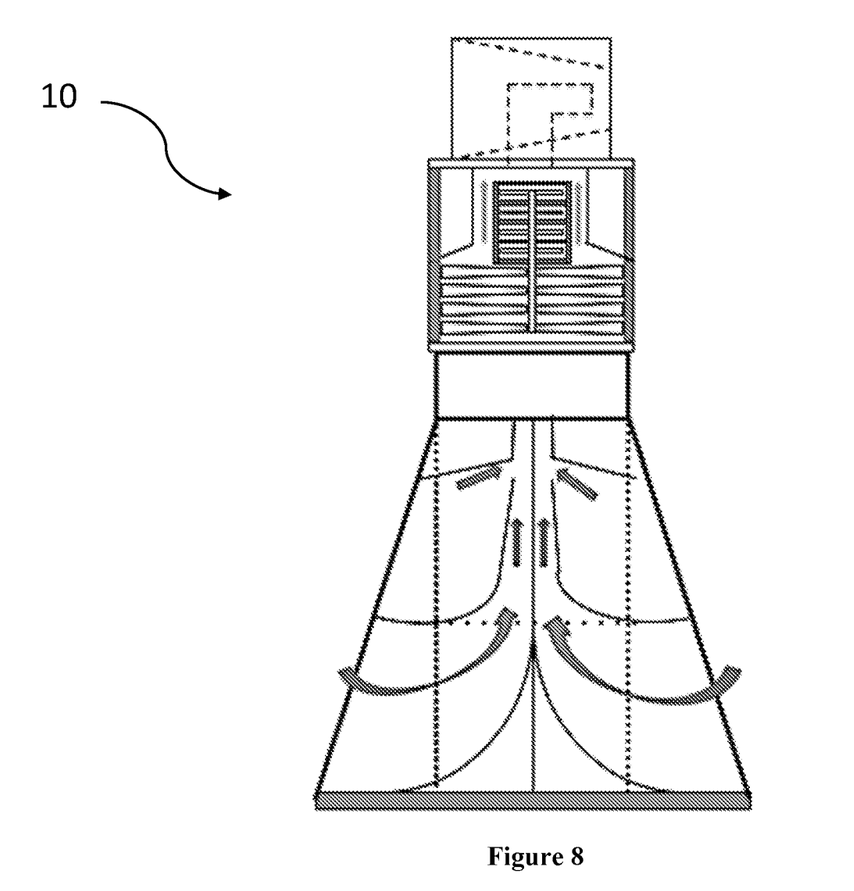
FIG. 8 illustrates a cross sectional view of yet another embodiment of the apparatus (10) of the present disclosure.
Figure 9:
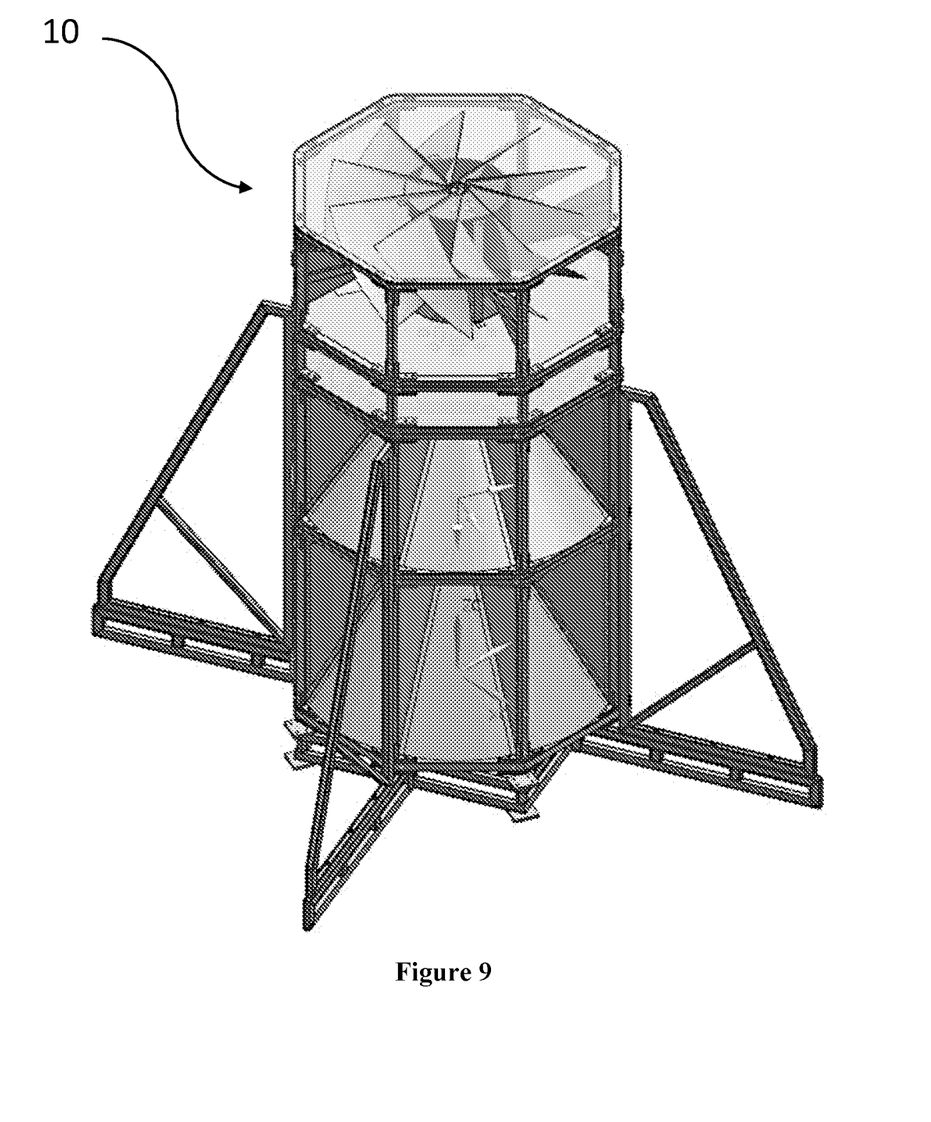
FIG. 9 illustrates a perspective view of the yet another embodiment of the apparatus (10) of the present disclosure.

In one embodiment, the present apparatus (10) may not have a secondary wind duct (16) if the average speed of the surrounding wind is sufficient to facilitate the primary wind duct (12) alone to generate complete pressure. A representation of this embodiment is provided in FIGS. 8 (cross section) and 9 (perspective).

At least one pressure-balancing and guiding unit (18) is mounted coaxially on the secondary wind duct (16) which comprises a duct end (18a) and a blade end (18b). The duct end (18a) is fitted with at least one one-way valve for each converging module (X) which prevents wind from escaping out of the apparatus (10) through the wind ducts (12,16). This contributes to the self-reinforcing effect. The blade end (18b) is fitted with a plurality of nozzles to guide the wind contained in the vertical channel (14) into a primary blade unit (20) at a rate which causes rotation of the blade to a maximum speed, thereby facilitating maximum power generation. This further contributes to the self-reinforcing effect. The cross section of the nozzles at the blade end (18b) is varied based on the inflow wind speed and pressure. This is done to reduce variation of rotor and vibration in overall system.

At least one primary blade unit (20) is mounted coaxially on the pressure-balancing and guiding unit (18) and comprises at least one blade mounted on a shaft that is adapted to rotate due to the high velocity wind coming in from the pressure-balancing and guiding unit (18). In one embodiment, the blade(s), represented by the symbol Y, mounted on the shaft of the primary blade unit are helical. The blade parameters that vary according to the wind flow speed are diameter, helix angle, helix pitch and width of the blades. Further, the angle of inclination of the primary blade(s) (20) is defined by conditions such as wind inflow speed, required torque, required output and rated RPM of the generator.

Figure 4:
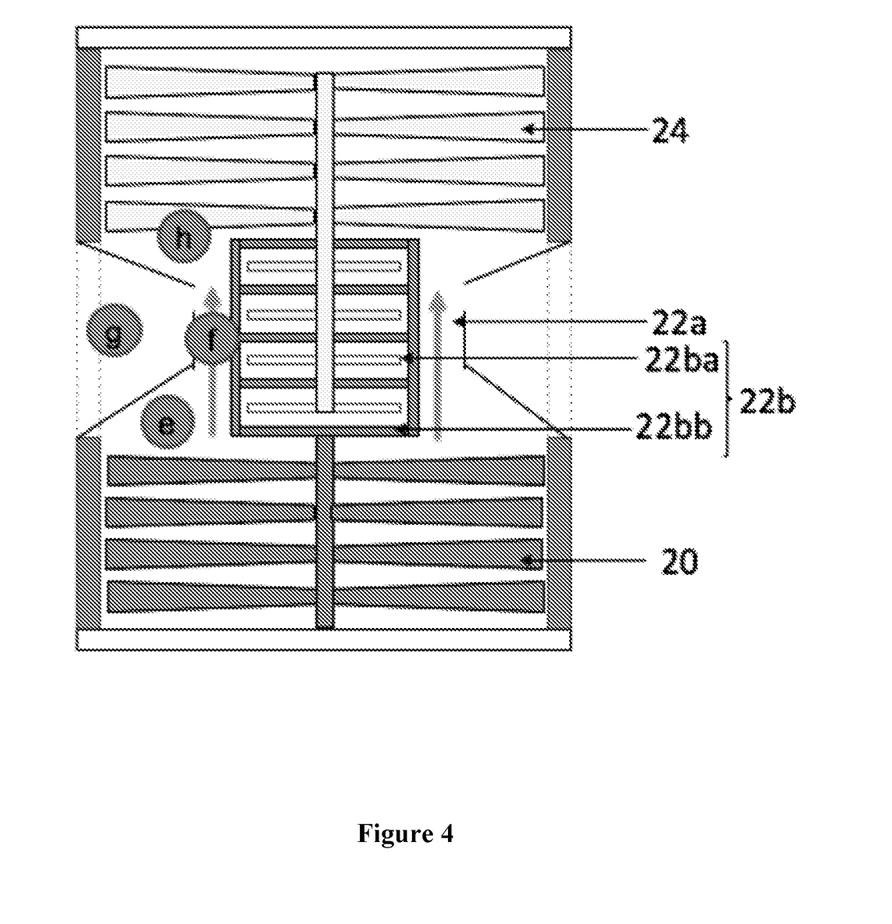
FIG. 4 illustrates the mechanism of wind flow through the middle part of the apparatus (10) of the present disclosure.

At least one booster and generator unit (22) is further mounted coaxially on the primary blade unit (20) and comprises at least one wind intake system (22a) comprising booster ducts and at least one axial flux DC generator (22b). The booster ducts are adapted to increase the volume of the wind and to maintain the required pressure for operation of the apparatus (10). FIG. 4 illustrates this phenomenon. As wind from the pressure-balancing and guiding unit (18) hits the blade(s) through nozzles, it loses kinetic energy and pressure. To get its kinetic energy back, the pressure is boosted through the booster ducts. Point (e) demonstrates wind exiting from the primary blade(s) (20), Point (f) denotes the converging duct which again create the Bernoulli's effect. Point (g) is the booster intake chamber (22a) and Point (h) is where the wind hits the secondary blade(s) (24). Thus, the booster ducts further assist in contributing to the self-reinforcing effect on the wind traversing the apparatus.

The axial flux DC generator (22b) comprises a plurality of alternating layers of copper wire coils (22ba) and permanent magnets (22bb), adapted to convert the mechanical energy of the rotating shaft of the primary blade unit (20) to electrical energy. The alternating layers of copper wire coils (22ba) and permanent magnets (22bb) have the ability to get influenced by the motion of the surrounding blades, as described in detail subsequently, which further buttresses the self-reinforcing effect.

At least one secondary blade unit (24) is mounted coaxially over the booster and generator unit (22) and comprises at least one blade, represented by the symbol Y, mounted on a shaft and adapted to rotate due to the velocity of the wind coming in from the booster and generator unit (22). In one embodiment, the blade(s) mounted on the shaft of the secondary blade unit (24) are helical. The blade parameters that vary according to the wind flow speed are diameter, helix angle, helix pitch and width of the blades. Further, the angle of inclination of the secondary blade(s) (24) is defined by conditions such as wind inflow speed, required torque, required output and rated RPM of the generator. In one embodiment, the angle of inclination of the secondary blade(s) (24) is opposite to that of the primary blade(s) (20). In one embodiment, if the power requirement is low, the present apparatus (10) may run without the secondary blade unit (24) as the generator is adapted to extract maximum power from the flowing wind.

As a characteristic feature of the present apparatus (10), the direction of rotation of the copper wire coils (22ba) in the axial flux DC generator (22b) is influenced by the direction of rotation of the secondary blade(s) (24) and the direction of rotation of the permanent magnets (22bb) in the axial flux DC generator (22b) is influenced by the direction of rotation of the primary blade(s) (20) to create a counter-rotating motion between the primary blade unit (20), the secondary blade unit (24) and the components of the booster and generator unit (22). The counter-rotating motion causes an increase in the relative speed of the magnets (22bb) and the coils (22ba) which causes an increase in the velocity of the wind flowing through the apparatus (10) and a resultant increase in the impact of the high velocity wind on the blades. This increase in impact increases the efficiency of the apparatus (10) and even further amplifies the self-reinforcing effect.

Figure 5:
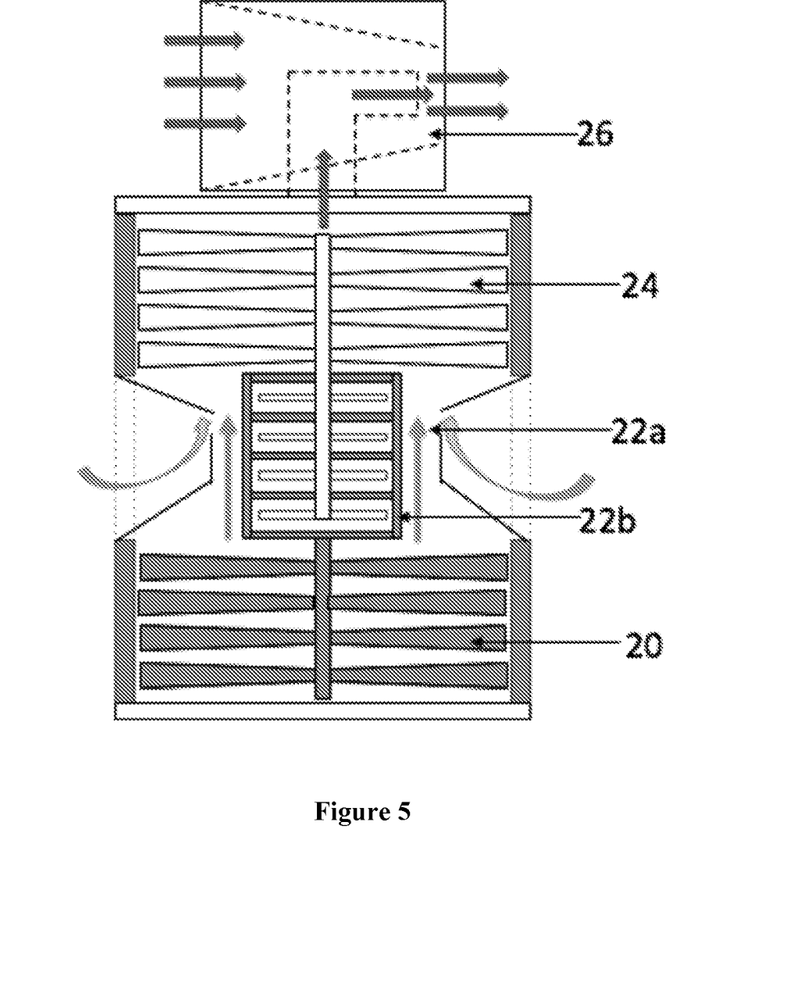
FIG. 5 illustrates the mechanism of wind flow through the top part of the apparatus (10) of the present disclosure.

The present apparatus (10) comprises at least one wind extractor (26) mounted coaxially on the secondary blade unit (24) which is adapted to utilize the surrounding wind flow to create vacuum for exit wind which creates additional pressure potential between the intake and the exhaust. The functioning of the wind extractor (26) is illustrated in FIG. 5. Thus, even at the last stage, the self-reinforcing effect of the apparatus (10) is maintained.

The apparatus (10) of the present disclosure is, in one embodiment, a vertical axis wind turbine. The apparatus (10) has a polygonal base frame, wherein the dimensions of the polygon is based on various factors such as the available mounting space and the average wind speed. The polygon is at least one selected from the group consisting of triangle, square, rectangle, hexagon and octagon.

The apparatus (10) of the present disclosure is adapted to generate electricity ranging from 0.1 Kw to 20 Kw. Typically, the present apparatus (10) addresses the need of generating electricity at a small scale such as for individual households, residential apartments, farmlands, small commercial and industrial complexes and the like. In one embodiment, as a characteristic, the present apparatus (10) is designed for mounting on the civil structures for which they generate electricity. With this end use in mind, the construction and design of the apparatus (10) has been tailored to accommodate the weight and dimensions restrictions. The material for the structure of the apparatus (10) is selected to meet the structural requirements and to keep weight as low as possible. In one embodiment, weight of the apparatus (10) is below 2 tonnes. Notwithstanding the afore-mentioned, it is crucial to note that the design is scalable for any required capacity. Similarly, the apparatus (10) is also capable of being installed on the ground.

Figure 6:
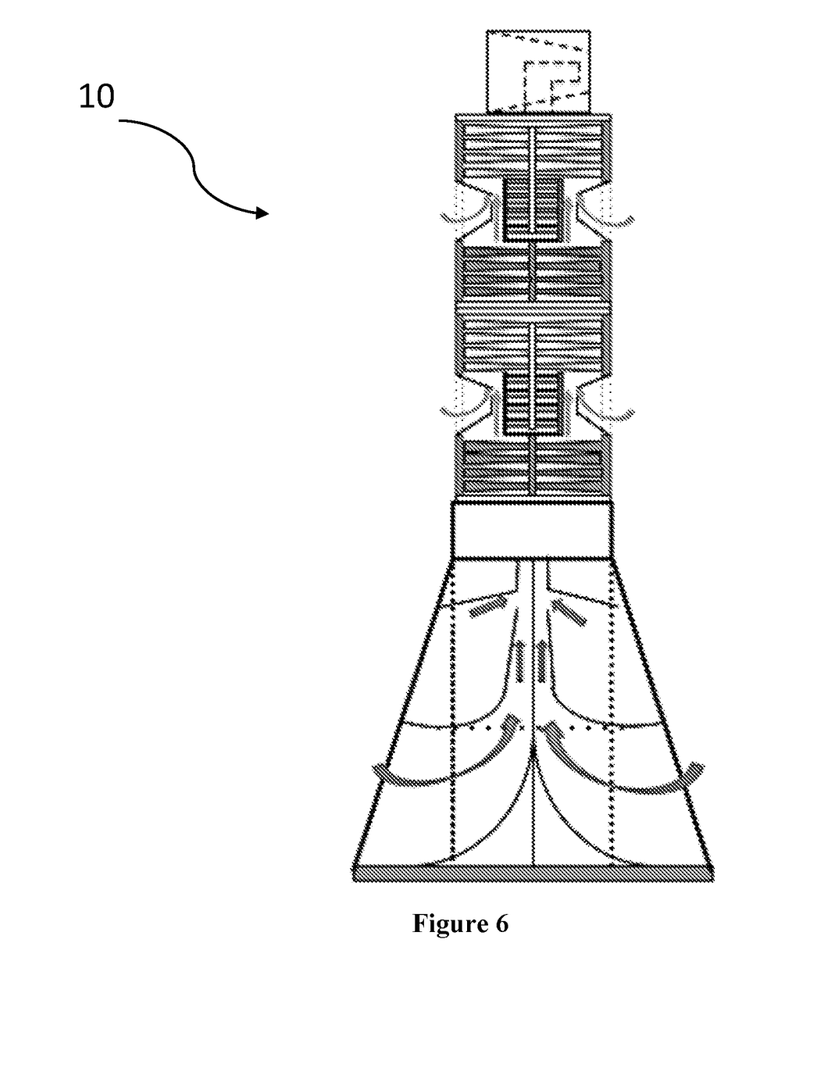
FIG. 6 illustrates a cross sectional view of another embodiment of the apparatus (10) of the present disclosure.
Figure 7:
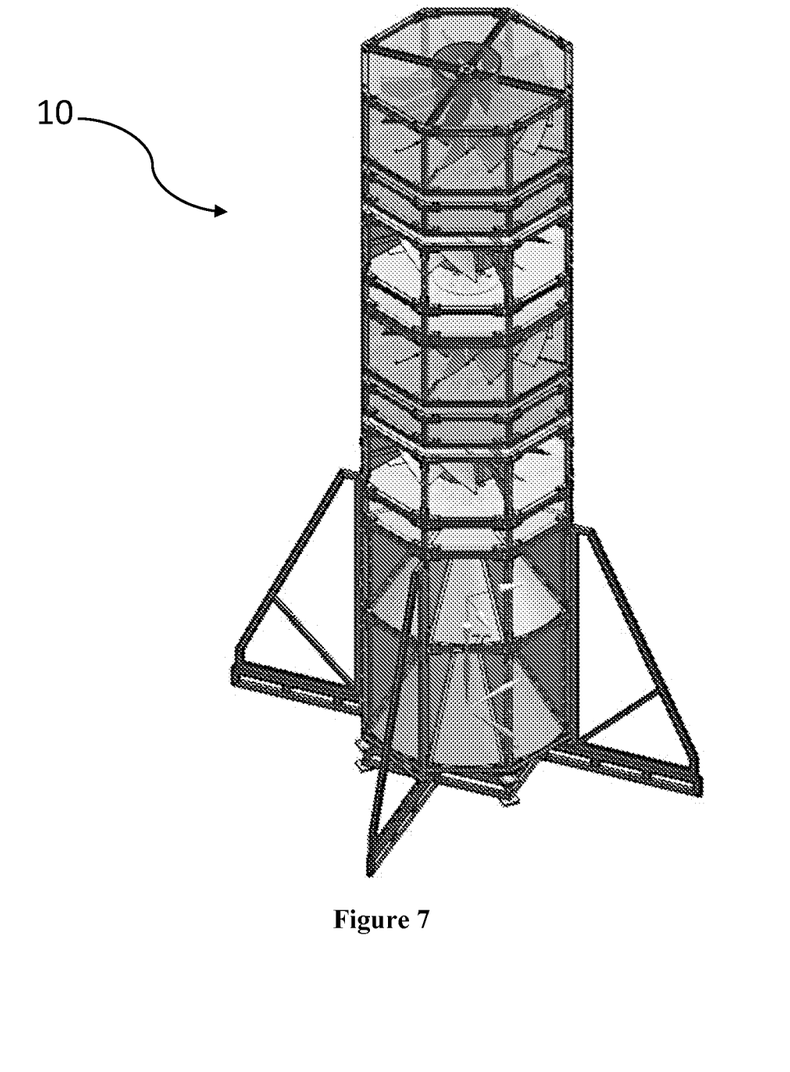
FIG. 7 illustrates a perspective view of the another embodiment of the apparatus (10) of the present disclosure.

In another embodiment of the present apparatus (10), as illustrated in FIGS. 6 (cross section) and 7 (perspective), the stack comprising the primary blade unit (20), the booster and generator unit (22) and the secondary blade unit (24) can be added in multiples, in case there is a higher power output requirement.

The embodiments described herein above are non-limiting. The foregoing descriptive matter is to be interpreted merely as an illustration of the concept of the proposed invention and it is in no way to be construed as a limitation. Description of terminologies, concepts and processes known to persons acquainted with technology has been avoided to preclude beclouding of the afore-stated embodiments.

Technical Advantages and Economic Significance

The technical advantages and economic significance of the apparatus (10) and system of the present disclosure include but are not limited to:

Avoids transmission losses

Avoids loss of pressure and velocity as wind passes through the length of the apparatus Minimal ecological footprint Precludes inclusion of suction apparatus The design can be scaled with multiple variables based on inflow wind volume and required output Produces electricity faster and economically Apparatus is light weight Apparatus is self-reinforcing The foregoing objects of the invention are accomplished, and the problems and shortcomings associated with prior art techniques and approaches are overcome by the proposed invention described in the present embodiment. Detailed descriptions of the preferred embodiment are provided herein; however, it is to be understood that the proposed invention may be embodied in various forms. Therefore, specific details disclosed herein are not to be interpreted as limiting, but rather as a basis for the claims and as a representative basis for teaching one skilled in the art to employ the proposed invention in virtually any appropriately detailed system, structure, or matter.

The embodiments of the invention as described above, and the processes disclosed herein will suggest further modification and alterations to those skilled in the art. Such further modifications and alterations may be made without departing from the scope of the invention.

I claim:

1. An apparatus (10) for wind power generation comprising:
   a. at least one primary wind duct (12) comprising a plurality of converging modules arranged centripetally along a vertical channel (14); said modules being adapted to draw in the wind blowing in the surroundings, compress and direct the resulting high velocity wind into said vertical channel (14);
   b. at least one secondary wind duct (16) mounted coaxially over said primary wind duct (12), comprising a plurality of converging modules arranged centripetally along said vertical channel (14) and adapted to draw in the wind blowing in the surroundings, compress and direct the resulting high velocity wind into said vertical channel (14); wherein the high velocity wind blowing in the vertical channel (14), creates a low pressure area in said secondary duct (16) causing more wind to get sucked into the secondary duct (16), creating a cascading effect;
   c. at least one pressure-balancing and guiding unit (18) mounted coaxially on said secondary wind duct (16), comprising a duct end (18a) and a blade end (18b), wherein said duct end (18a) is fitted with at least one one-way valve for each converging module which prevents wind from escaping out of the apparatus (10) through the wind ducts (12,16) and said blade end (18b) is fitted with a plurality of nozzles to guide the wind contained in the vertical channel (14) into a primary blade unit (20), at a rate which facilitates maximum power generation;
   d. at least one primary blade unit (20) mounted coaxially on said pressure-balancing and guiding unit (18), comprising at least one blade mounted on a shaft and adapted to rotate due to the high velocity wind coming in from the pressure-balancing and guiding unit (18);
   e. at least one booster and generator unit (22) mounted coaxially on the primary blade unit (20), comprising at least one wind intake system (22a) and at least one axial flux DC generator (22b), wherein said wind intake system (22a) comprises booster ducts adapted to increase the volume of the wind and to maintain the required pressure for operation of the apparatus (10) and said axial flux DC generator (22b) comprises a plurality of alternating layers of copper wire coils (22ba) and permanent magnets (22bb), adapted to convert the mechanical energy of the rotating shaft of the primary blade unit (20) to electrical energy;
   f. at least one secondary blade unit (24) mounted coaxially over said booster and generator unit (22), comprising at least one blade mounted on a shaft and adapted to rotate due to the velocity of the wind coming in from the booster and generator unit (22); and
   g. at least one extractor (26) mounted coaxially on said secondary blade unit (24) and adapted to utilize the surrounding wind flow to create vacuum for exit wind, thereby creating additional pressure potential between intake and exhaust,
   wherein the direction of rotation of the copper wire coils (22ba) in the axial flux DC generator (22b) is influenced by the direction of rotation of said secondary blade(s) (24) and the direction of rotation of the permanent magnets (22bb) in the axial flux DC generator (22b) is influenced by the direction of rotation of said primary blade(s) (20) to create a counter-rotating motion between the primary blade unit (20), the secondary blade unit (24) and the components of the booster and generator unit (22), thereby causing an increase in the velocity of the wind flowing through the apparatus (10) and a resultant increase in the impact of said high velocity wind on the blades; further amplifying the self-reinforcing effect occurring at each stage of the apparatus (10).

2. The apparatus (10) as claimed in claim 1, being a vertical axis wind turbine.

3. The apparatus (10) as claimed in claim 1, having a polygonal base frame, wherein the dimensions of the polygon are based on at least one factor selected from the group consisting of the available mounting space and the average wind speed and the polygon being at least one selected from the group consisting of triangle, square, rectangle, hexagon and octagon.

4. The apparatus (10) as claimed in claim 1, wherein the ratio between the primary wind duct (12) height and the secondary wind duct (14) height is defined by the average wind speed to get required vacuum at the end of primary wind duct.

5. The apparatus (10) as claimed in claim 1, wherein the primary wind duct (12) height is greater than the secondary wind duct (14) height.

6. The apparatus (10) as claimed in claim 1, wherein the blades mounted on the shaft of the primary blade unit (20) and the secondary blade unit (24) are helical.

7. The apparatus (10) as claimed in claim 1, wherein the angle of inclination of the primary (20) and secondary blades (24) is defined by at least one condition selected from the group consisting of wind inflow speed, required torque, required output and rated RPM of the generator.

8. The apparatus (10) as claimed in claim 1, wherein the angle of inclination of the secondary blade(s) (24) is opposite to that of the primary blade(s) (20).

9. The apparatus as claimed in claim 1, being adapted to generate electricity ranging from 0.1 Kw to 20 Kw.

* * * * *